(12) United States Patent
Anastasia et al.

(10) Patent No.: US 6,518,525 B1
(45) Date of Patent: Feb. 11, 2003

(54) GEAR RECOGNITION SWITCH SYSTEM

(75) Inventors: Nicholas D. Anastasia, Pireas (GR); Charles M. Anastasia, Barrington, RI (US); Peter J. Bloznalis, Upton, MA (US); Engbertus Berkel, Wierden (DK)

(73) Assignee: Texas Instruments Incorporated, Dallas, TX (US)

( * ) Notice: Subject to any disclaimer, the term of this patent is extended or adjusted under 35 U.S.C. 154(b) by 581 days.

(21) Appl. No.: 09/021,667

(22) Filed: Feb. 10, 1998

Related U.S. Application Data

(60) Provisional application No. 60/060,044, filed on Sep. 25, 1997.

(51) Int. Cl.[7] ................................................. H01H 3/16
(52) U.S. Cl. ..................................... 200/61.91; 200/550
(58) Field of Search .......................... 200/61.91, 61.88, 200/61.85, 61.86, 16 D, 252, 547, 549, 550, 16 C, 166, 548; 340/456

(56) References Cited

U.S. PATENT DOCUMENTS

| | | | |
|---|---|---|---|
| 4,322,588 A | * | 3/1982 | Chumley et al. ......... 200/16 C |
| 4,441,000 A | * | 4/1984 | Suwa ........................ 200/548 |
| 5,015,808 A | | 5/1991 | Czarn et al. |
| 5,191,178 A | | 3/1993 | Baker et al. |
| 5,231,254 A | * | 7/1993 | Baker et al. ............. 200/61.91 |
| 5,325,083 A | | 6/1994 | Nassar et al. |
| 5,338,907 A | | 8/1994 | Baker et al. |
| 5,440,087 A | | 8/1995 | Cobb, III et al. |
| 5,525,768 A | | 6/1996 | Cobb, III et al. |
| 5,860,515 A | * | 1/1999 | Tomotoshi .................. 200/550 |

* cited by examiner

*Primary Examiner*—Renee Luebke
(74) *Attorney, Agent, or Firm*—Russell E. Baumann; Frederick J. Telecky, Jr.

(57) ABSTRACT

A recognition switch assembly (10) has a movable contact assembly (24) mounted on an actuator (22) mounted for sliding movement along a longitudinal direction (12a) in a housing (20) with a stationary contact board (26) mounted on the housing over the movable contact assembly (24). The actuator is formed with a laterally deflectable beam (22q) on one side of the actuator having a protrusion (22s) which cooperates with space protrusions (22p) on the opposed side for sliding engagement with opposed sidewalls (20f, 20g) of the housing. A pair of vertically deflectable beams (22k) having a protrusion (22n) slidingly engage platform surfaces (20b, 20c). When mounted in the housing, the beams are deformed to eliminate clearances between the actuator (22) and the housing (20) in both the vertical and lateral directions resulting in an improved, vibration independent, electrical output signal of the switch assembly.

8 Claims, 6 Drawing Sheets

GEAR RECOGNITION SWITCH SYSTEM

This application claims priority under 35 USC Section 119(e) (1) of provisional application No. 60/060,044 filed Sep. 25, 1997.

FIELD OF THE INVENTION

This invention relates generally to vehicular transmissions and more particularly to apparatus for sensing the position of the manual valve of an automatic transmission which determines the transmissions' mode at any given time.

BACKGROUND OF THE INVENTION

It is conventional to provide a switch assembly to receive mechanical gear selection inputs from the driver of a vehicle through various linkages and output electrical signals to the transmission electronic control unit indicative of the gear selections. Such switch assemblies generally comprise either a rotary movable contact mechanism such as those shown in U.S. Pat. Nos. 5,525,768 and 5,440,087, assigned to the assignee of the present invention, or a linear movable contact mechanism such as that shown in U.S. Pat. No. 5,231,254, also assigned to the assignee of the present invention. The present invention relates to the latter type in which an actuator carrying a set of movable contacts is caused to slide back and forth in dependence upon the longitudinal movement of the manual valve of the transmission. The movable contacts are spring biased into engagement with a stationary contact board having contact segments arranged in a selected pattern so that an on/off output signal is obtained based on the longitudinal position of the manual valve.

Typically, the actuator is held in place by a housing and some type of cover with clearance provided between the actuator, on the one hand, and the housing and cover on the other hand to permit the actuator to move with the manual valve. However, erratic and inconsistent voltage output signals have resulted from unintentional motion of the actuator due to the degree of motion available to the actuator. Clearances between the actuator and the housing and cover allow the actuator to move in all six directions of motion. Longitudinal, lateral and vertical translation together with pitch, yaw and roll motion alter the movable contact projection onto the stationary contacts thereby intensifying voltage drop irregularities. Also, as a result of vibration, the actuator will move within the associated clearances with sudden impacts between the actuator and the surrounding wall. This causes the contact mechanism to jump or bounce resulting in open signals. In addition, a more detrimental mode of failure can result after prolong vibration, that of contact wear. Vibration exacerbates the rubbing action of contacts against each other thereby breaking material, removing plating, if present, and roughening the interface. This action has been found to increase contact resistance from 1 ohm to as much as 700 ohms or more.

SUMMARY OF THE INVENTION

It is an object of the present invention to provide a gear recognition switch system which overcomes the above noted prior art limitations. Another object of the invention is the provision of a linear type gear recognition switch system which is less sensitive to vibration. Yet another object of the invention is the provision of a gear recognition switch system of the type described which is reliable and one which has improved contact life.

Other objects, advantages and details of the switch apparatus of this invention appear in the following detailed description of the preferred embodiment of the invention.

Briefly, in accordance with the invention, an actuator of a vehicular transmission gear recognition switch system mounts movable contacts which are adapted to slide into and out of engagement with stationary contact segments mounted in an associated housing in dependence upon the movement of the manual valve of the transmission. The actuator comprises integral, flexible members arranged to eliminate clearance between the actuator and the housing in two of three mutually perpendicular directions, the third mutually perpendicular direction being that of the intended motion of the actuator. A pair of beams of selected cross sectional area, one on either side of a manual valve engaging yoke, are formed by respective isolation slots in the base wall of the actuator with a projection formed centrally on each beam. The projections are adapted to be received on a platform surface of the housing and the compliant action of the beams eliminates vertical clearance when the beams are loaded upon assembly of the apparatus. An additional beam is located in the base wall on one side of the actuator by an isolation slot and is provided with a projection extended laterally outwardly from the side and which cooperates with spaced projections extending laterally outwardly from an opposite side of the actuator and which, when inserted in an opening in the housing, loads the additional beam in the lateral direction thereby eliminating lateral clearance. Elimination of the clearance in the vertical and lateral directions, while allowing longitudinal motion in dependence upon the longitudinal position of the manual valve of the transmission, results in elimination of contact chatter and enhancement of contact life in the gear recognition switch.

DETAILED DESCRIPTION OF PREFERRED EMBODIMENT

Figure 1:
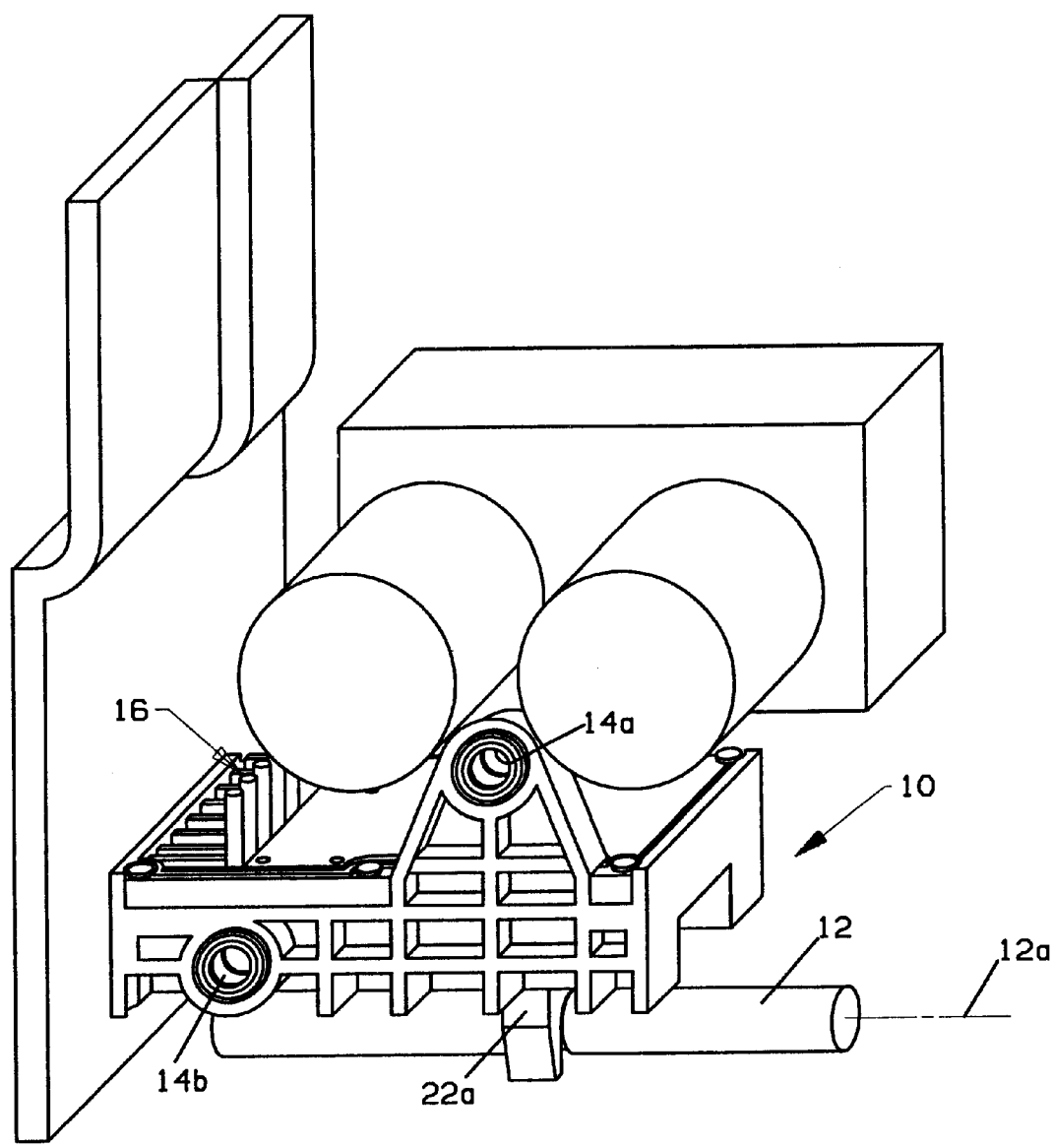
FIG. 1 is a perspective view of a gear recognition switch system made in accordance with the invention shown as it appears mounted in a schematically depicted vehicular transmission.
Figure 2:
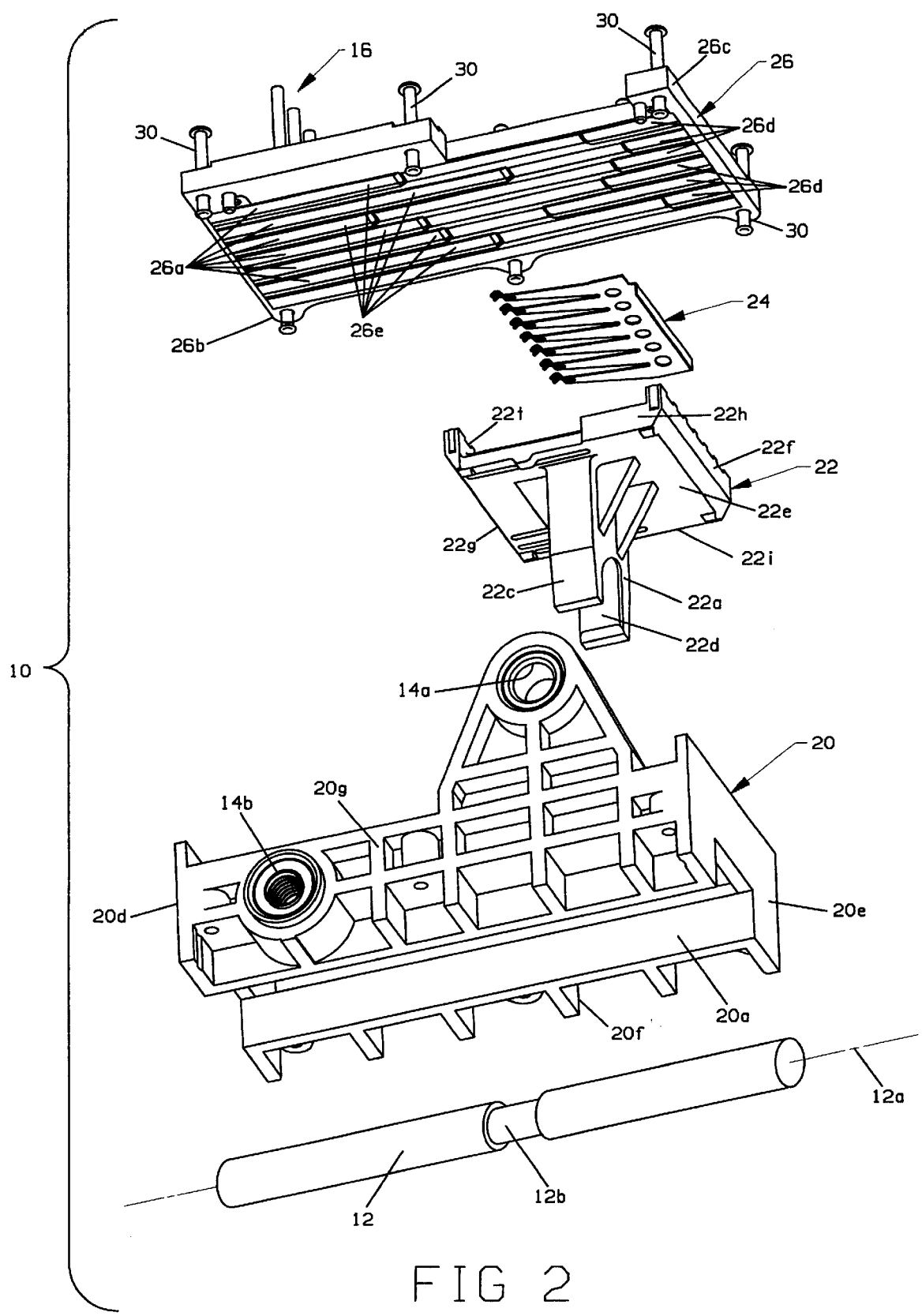
FIG. 2 is an exploded perspective view of the FIG. 1 system along with a stylized showing of a manual valve member taken from a position slightly below the system.
Figure 3:
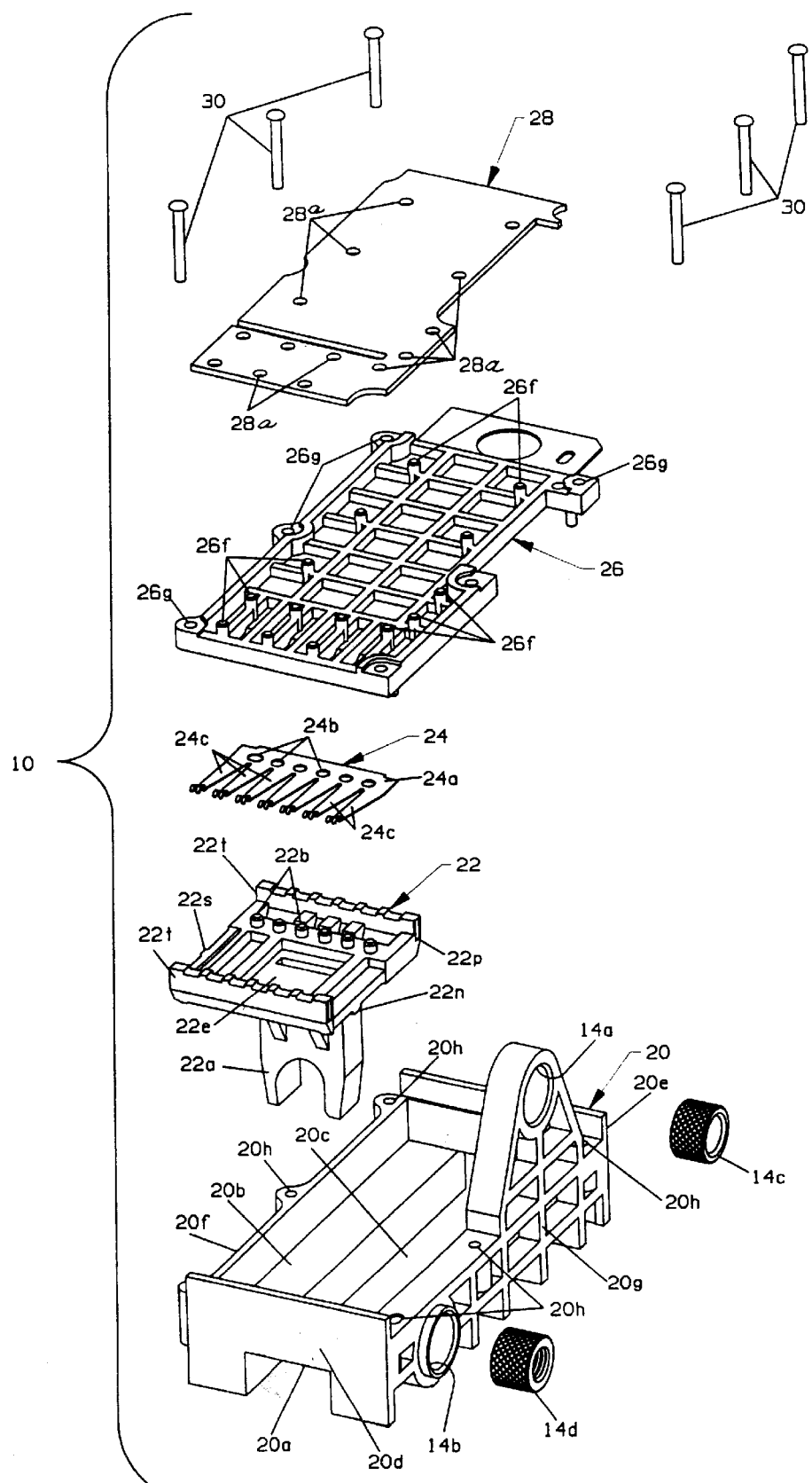
FIG. 3 is an exploded perspective view of the FIG. 1 system taken from a position slightly above the system.
Figure 4:
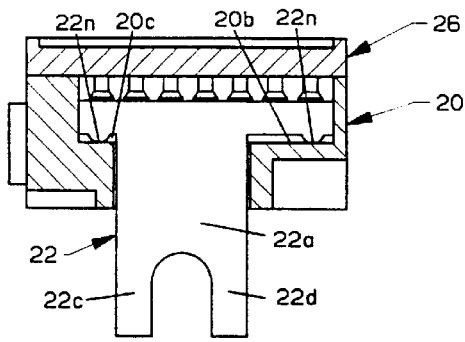
FIG. 4 is a cross sectional view taken through the assembly in a direction perpendicular to the longitudinal axis of the manual shaft receiving opening of the actuator's yoke.
Figure 5:
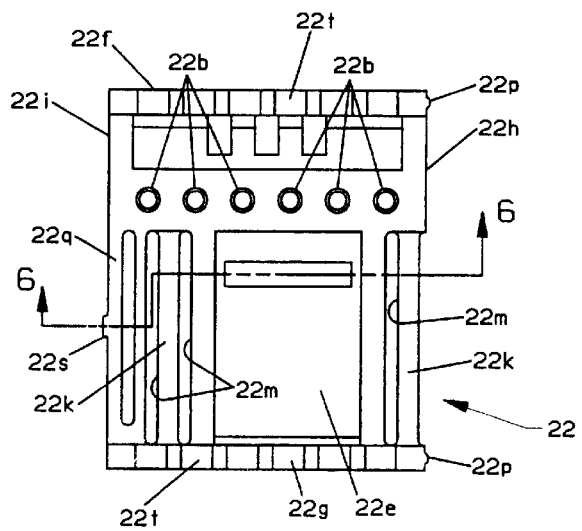
FIG. 5 is a top plan view of the FIGS. 1–4 actuator.

With reference to FIG. 1, a gear recognition switch system 10 made in accordance with the invention is shown mounted within a transmission housing and coupled to the manual valve member 12 of the transmission. System 10 is attached, as by suitable bolts (not shown) through bores 14a, 14b, to a wall of the transmission housing, removed for the purpose of illustration. System 10 provides an electrical output via pins 16 which is dependent upon the position of valve member 12 along the longitudinal axis 12a as will be discussed infra. As shown in FIGS. 2 and 3, assembly 10 comprises a housing 20, an actuator 22, a movable contact assembly 24, a stationary contact board 26 and a lid 28, in addition to connector 16. Housing 20 is formed of suitable moldable, electrically insulative material such as plastic with an open channel 20a between first and second platform surfaces 20b, 20c extending from opposed end walls 20d, 20e respectively which define first and second extremities of open channel 20a (see FIG. 3). The platform surfaces 20b, 20c serve as a sliding seat for the actuator to be discussed below. Opposed sidewalls 20f, 20g also form part of the actuator sliding seat arid extend between the end walls and above the platform surfaces a selected height. Walls 20f, 20g receive contact board 26 thereon and for that purpose are provided with bores 20h. Bores 14a, 14b, for mounting the switch system to the transmission housing wall, are provided with suitable bushings 14c, 14d.

Actuator 22, formed of suitable moldable, electrically insulative material, such as the same material used for housing 20, is provided with a yoke 22a extending downwardly from base wall 22e and mounts movable contact assembly 24 on its upper side. Movable contact assembly 24 has a base strip 24a having a plurality of mounting apertures 24b which are received on pegs 22b of actuator 22 which are staked over to lock the movable contact assembly thereon. Movable contact assembly 24 has a plurality of electrically conductive, cantilever mounted, contact arms 24c each having a bifurcated contact tip adapted to be biased into engagement with contact board 26 which is mounted over the movable contact assembly. Spacing between the fixed base strip 24a of the movable contact assembly and stationary contact board 26 is determined by castellated, upstanding end walls 22t.

Contact board 26, formed of suitable moldable, electrically insulative material, has a plurality of spaced, linear contact paths 26a extending between ends 26b, 26c and separated from one another by electrically insulative ribs 26d. Electrically conductive contact segments 26e are disposed at selected longitudinal locations in paths 26a according to a preselected contact pattern. Contact board 26 is provided with a plurality of pegs 26f extending upwardly from its upper side which are received in matching bores 28a of lid 28 and staked thereover to lock the lid to board 26.

Actuator 22 is received in housing 20 with yoke 22a extending through channel 20a of the housing and with spaced arms 22c, 22d of the generally U-shaped yoke 22a received in a reduced diameter section 12b of manual valve member 12. The width of arms 22c, 22d taken in the longitudinal direction is selected to closely match the axial length of section 12b so that there is minimal clearance in the longitudinal direction. Lid 28 is placed over sidewalls 26f, 26g of actuator 26 and fastened to housing 20 by means of fasteners 30 received through bores 26g of contact board 26 and 20h of housing 20. Actuator 22 is adapted to slide back and forth between first and second extremities of open channel 20a on the actuator sliding seat formed by platform surfaces 20b, 20c by means of motion imparted through yoke 22a by longitudinal movement of manual valve member 12 along axis 12a. Movable contact assembly 24 is connected to an electrical source (not shown) through pins 16 and is adapted to close an electrical circuit with each of the stationary contact segments 26e when in physical engagement therewith. As actuator 22 moves, movable contacts 24c slide along respective contact paths 26a in physical engagement therewith so that electrical engagement is effected as the contacts move into engagement with respective stationary contact segments 26e.

Figure 6:
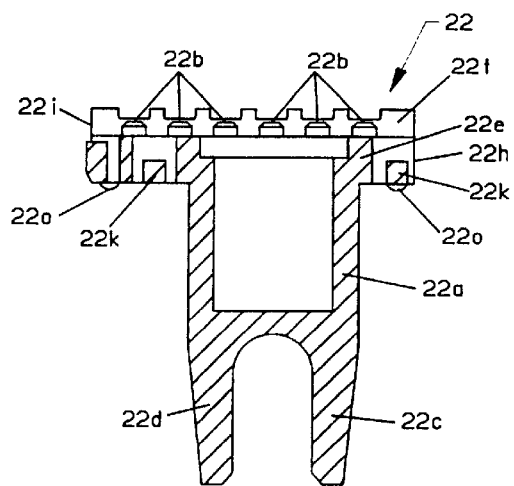
FIG. 6 is a cross sectional view taken on line 6—6 of FIG. 5.
Figure 7:
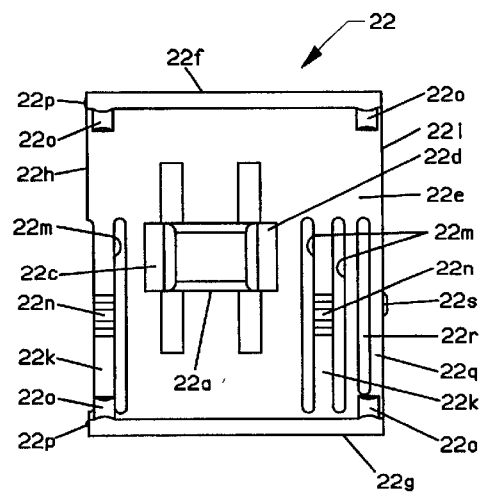
FIG. 7 is a bottom plan view of the FIG. 5 actuator.
Figure 8:
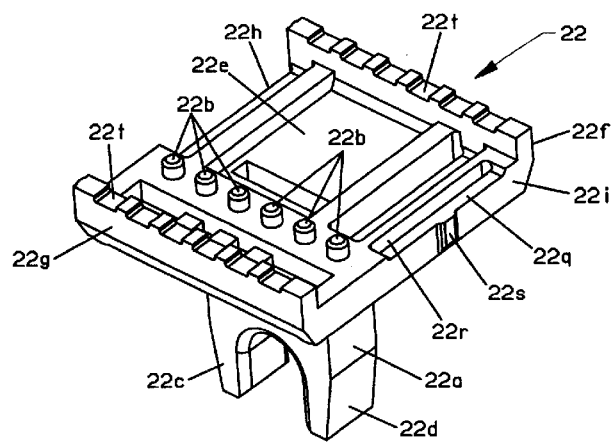
FIG. 8 is a perspective view of the actuator from a position above the actuator.
Figure 9:
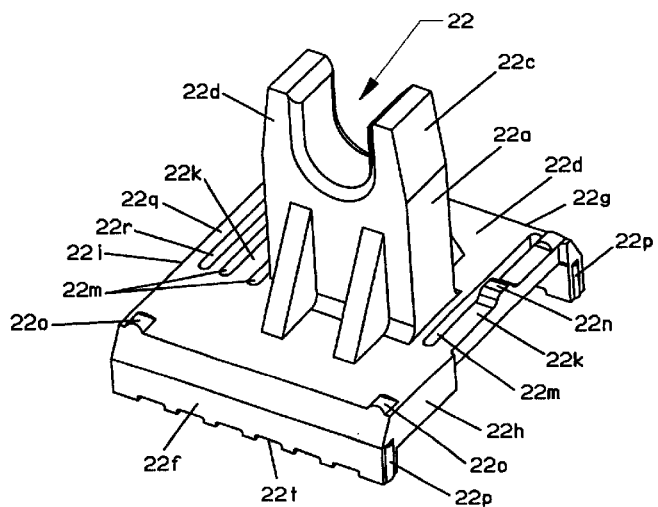
FIG. 9 is a perspective view of the actuator from a position below the actuator.

With particular reference to FIGS. 4–9, actuator 22 has a base wall 22e having opposed end portions 22f, 22g and opposed side portions 22h, 22i. First and second, essentially identical beams 22k having a selected cross sectional area are formed in wall 22e by means of isolation slots 22m and a protrusion 22n is centrally formed between the ends of each beam extending downwardly from the bottom surface of each beam as seen in FIG. 9. As best seen in FIG. 6, the cross sectional area of beams 22k is chosen, in cooperation with the length of isolation slots 22m and the material of the actuator, to provide a selected stiffness to the beams, allowing the beams to be deflected in the vertical direction when an upward force is applied to protrusions 22n as will be explained below. A protrusion 22o is also formed in the lower surface of wall 22e at each corner of the wall having a height less than that of protrusions 22n and serves both as a stop surface limiting the deflection of beams 22k as well as a sliding surface engageable with platform surfaces 20b, 20c.

A third beam 22q is formed at side 22i of the actuator by longitudinally extending isolation slot 22r and a laterally outwardly extending protrusion 22s is formed centrally on beam 22q. Protruding ribs 22p, extending laterally outwardly, are formed on opposite side 22h and serve as a sliding surface on the inside of wall 20g. The distance between sidewalls 20f, 20g of housing 20 is selected to form an interference fit with actuator 22 so that beam 22q will be deflected laterally a selected amount when actuator 22 is placed in housing 20.

When contact board 26 is fastened to housing 20, beams 22k will be deflected vertically and beam 22q will be deflected laterally eliminating clearances between the actuator and the housing in the Z (vertical) direction and the Y(lateral) direction essentially.limiting movement to the X (longitudinal) direction. The width of arms 22c, 22d (along the longitudinal axis) is selected to be closely received in the reduced diameter portion 12a of manual valve member 12 so that longitudinal movement will be limited essentially to the movement of the manual valve member itself and with yaw about the Z direction, pitch about the Y direction and roll about the X direction essentially eliminated.

The stiffness of beams 22k, 22q, determined by the material of the actuator, cross section of the beams and the length of the respective isolation slots, is preferably selected so that the assembly will vibrate at or above 1000 Hertz, suitable for use in an automotive environment, while at the same time staying within an acceptable window of allowable frictional force required to move the actuator along the longitudinal axis by the manual valve. That is, when the shift lever is moved by the driver to select a particular gear position, the gear shift lever rotates and the detent spring snaps a roller into a detent at a fixed position. This detent lever also drives the motion of the manual valve and if too much force is needed to move the actuator the precise positioning of the mechanism will be adversely affected.

Figure 10:
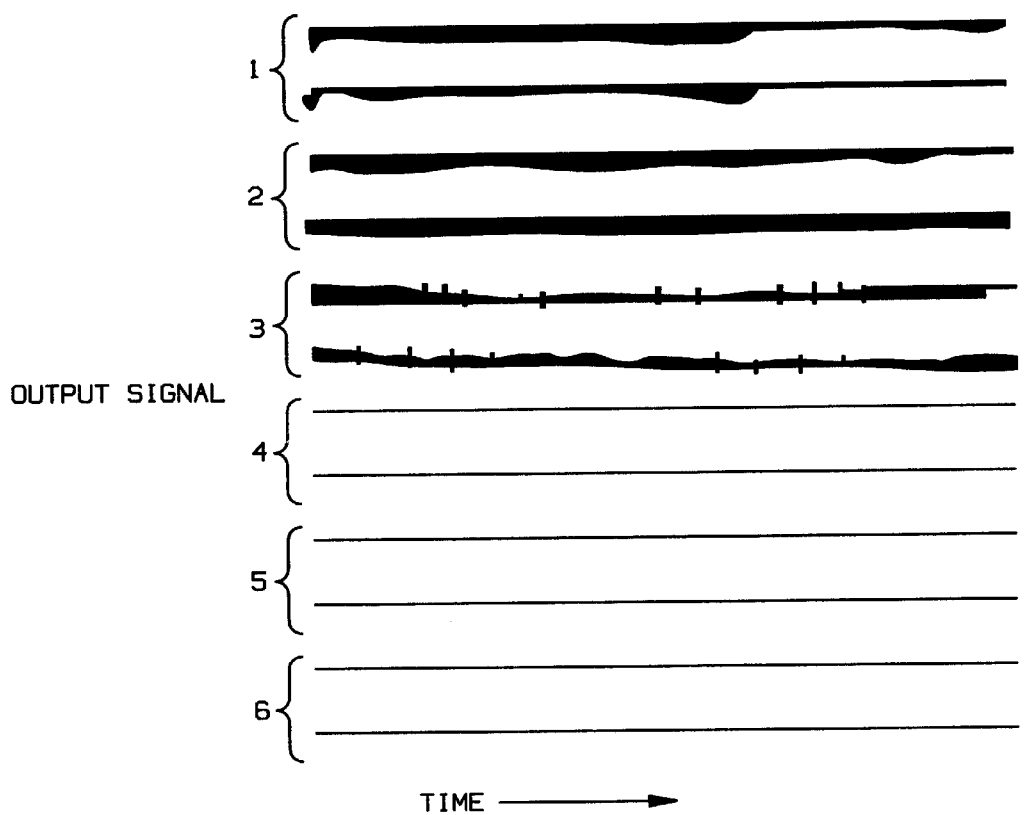
FIG. 10 is a graph showing the voltage output signal of six different switches subjected to Z-axis vibration, switches 1, 2 and 3 being prior art switches and switches 4, 5 and 6 being made in accordance with the invention.

FIG. 10 shows the output signal of six different electrical switches when subjected to Z-axis vibration of sweeping from approximately 700 to 1000 Hertz at 0.44 octaves per minute using a 20 gram mass at 135° C. temperature and a scan rate of 2 mm/sec. Devices 4–6, were provided with compliant features of beams 22k, 22q and devices 1–3 without such features. Devices 1–3 displayed an erratic output due to undesirable actuator motion while devices 4–6 displayed a stable output as a result of the compliant features of beams 22k, 22q made in accordance with the invention.

The compliant features allow the actuator to absorb vibration and permit the spring contact arms to maintain continuous engagement with the stationary contact board with a controlled contact force independent of the loading of the actuator with the result that the state of the several switches is dependent solely on the position of the manual valve regardless of vibration.

It should be understood that although the preferred embodiment of the invention has been described in order to illustrate the invention, the invention includes various modifications and equivalents to the disclosed embodiment. It is intended that the invention include all such modifications and equivalents falling within the scope of the appended claims.

What is claimed:

1. Gear recognition switch apparatus for use in vehicular transmissions comprising a housing having a bottom wall formed with an elongated channel therein along a longitudinal direction, the bottom wall having a platform surface on either side of the channel and having sidewalls extending upwardly from the bottom wall to form an actuator seat, an actuator received on the actuator seat, the actuator having a base wall and a manual valve coupling portion extending downwardly through the channel, the actuator formed with flexible portions which form an interference fit in the actuator seat with the actuator slidable along the platform surfaces in the longitudinal direction between first and second extremities of said elongated channel, said base wall of the actuator having opposed first and second ends in the longitudinal direction and opposed first and second sides in a lateral direction generally perpendicular to the longitudinal direction in which a flexible portion is formed by a longitudinally extending isolation slot formed in the base wall adjacent the first side thereof forming a flexible beam, said flexible beam having a protrusion thereon extending laterally outwardly, a movable contact assembly disposed on top of the base wall, the movable contact assembly having at least one movable contact arm biased away from the base wall of the actuator, and a stationary contact board received over the movable contact assembly and attached to the housing, the stationary contact board having at least one stationary contact path with an electrically conductive segment selectively positioned in a portion of the contact path, the at least one movable contact arm biased into engagement with the at least one stationary contact path.

2. Gear recognition switch apparatus according to claim 1 in which the protrusion is formed centrally on the flexible beam.

3. Gear recognition switch apparatus according to claim 1 further comprising a pair of s,paced apart protrusions on the second side of the actuator extending laterally outwardly.

4. Gear recognition apparatus according to claim 1 in which the housing and actuator are formed of moldable plastic material.

5. Gear recognition switch apparatus for use in vehicular transmissions comprising a housing having a bottom wall formed with an elongated channel therein along a longitudinal direction, the bottom wall having a platform surface on either side of the channel and having sidewalls extending upwardly from the bottom wall to form an actuator seat, an actuator received on the actuator seat, the actuator having a base wall and a manual valve coupling portion extending downwardly through the channel, the actuator formed with flexible portions which form an interference fit in the actuator seat with the actuator slidable along the platform surfaces in the longitudinal direction between first and second extremities of said elongated channel, said base wall of the actuator has opposed first and second ends in the longitudinal direction and opposed first and second sides in a lateral direction generally perpendicular to the longitudinal direction in which a flexible portion is formed by a pair of vertically deflectable beams formed in the base wall with the manual valve coupling portion disposed between the pair of beams and a protrusion is formed on each beam extending vertically to a preselected height away from the base wall, a movable contact assembly disposed on top of the base wall, the movable contact assembly having at least one movable contact arm biased away from the base wall of the actuator, and a stationary contact board received over the movable contact assembly and attached to the housing, the stationary contact board having at least one stationary contact path with an electrically conductive segment selectively positioned in a portion of the contact path, the at least one movable contact arm biased into engagement with the at least one stationary contact path.

6. Gear recognition apparatus according to claim 5 in which each protrusion is formed centrally on the respective deflectable beam.

7. Gear recognition apparatus according to claim 5 in which the pair of deflectable beams is formed by at least one longitudinally extending isolation slot through the base wall.

8. Gear recognition apparatus according to claim 5 further comprising a plurality of spaced apart protrusions extending vertically away from the base wall to a height less than the preselected height of the protrusions formed on the vertically deflectable beams.

* * * * *